United States Patent
Arwood et al.

(10) Patent No.: US 6,619,015 B2
(45) Date of Patent: Sep. 16, 2003

(54) AIRBAG FOLDING APPARATUS AND METHOD OF FOLDING

(75) Inventors: Robert L. Arwood, Fraser, MI (US); Eric Baumbach, Sterling Heights, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 69 days.

(21) Appl. No.: 10/020,066

(22) Filed: Dec. 14, 2001

(65) Prior Publication Data

US 2002/0078664 A1 Jun. 27, 2002

Related U.S. Application Data

(60) Provisional application No. 60/257,474, filed on Dec. 21, 2000.

(51) Int. Cl.[7] .............................................. B65B 63/04
(52) U.S. Cl. ............................................ 53/429; 53/116
(58) Field of Search ........................ 53/575, 578, 574, 53/429, 116

(56) References Cited

U.S. PATENT DOCUMENTS 4,182,236 A * 1/1980 Greer ........................ 100/218
6,248,052 B1 * 6/2001 Kleeberger et al. ......... 493/374
6,260,330 B1 * 7/2001 Borowski et al. ............. 53/116
6,305,150 B1 * 10/2001 Dietsch ........................ 53/117
6,327,838 B1 * 12/2001 Maul et al. .................... 53/429

* cited by examiner

Primary Examiner—Stephen F. Gerrity
Assistant Examiner—Michelle López
(74) Attorney, Agent, or Firm—Lonnie Drayer; Jarett Rieger; Markell Seitzman

(57) ABSTRACT

An airbag folding apparatus includes a folding tube, a folder support apparatus, and a plunger mechanism. The folding of an airbag utilizing the folding apparatus comprises the following steps. A vehicle airbag is attached to the plunger mechanism and the airbag is lowered into the folding tube. The plunger mechanism is introduced into the folding tube after the airbag is completely inside the folding tube. The plunger mechanism is forcibly lowered into the folding tube causing the airbag to be compressed or folded. The plunger mechanism remains exterior to the airbag throughout the folding process. The plunger mechanism is then detached and a fold retention sheet is wrapped around the folded airbag.

17 Claims, 11 Drawing Sheets

AIRBAG FOLDING APPARATUS AND METHOD OF FOLDING

This application claims the benefit of U.S. Provisional Application No. 60/257,474 entitled, "Passenger side air bag folding apparatus and method of folding," filed on Dec. 21, 2000.

FIELD OF THE INVENTION

The present invention relates to a method and an apparatus for folding an airbag.

BACKGROUND AND SUMMARY OF THE INVENTION

Vehicle airbags are found in most automobiles and in the event of a collision, they are inflated by gas originating from an inflator. The vehicle airbags together with the inflators are mounted in a vehicle as part of the airbag module. The airbags are usually arranged in the airbag module in a folded state and must be folded in such a way that it can unfold as quickly as possible in a specific direction.

Airbags are conventionally folded by spreading the airbag cushion out flat and then folding it specifically at predetermined points resulting in a folded arrangement. This folded arrangement can be accomplished manually, by an automated machine, or both.

There are several disadvantages to the conventional folding method. For example, a very large amount of space is necessary for the purpose of folding the airbag, since the entire airbag must first be spread out flat. Also, the folding process is time consuming since the airbag has to be precisely folded. Furthermore, for automated folding of the airbag, there is a need for a relatively complicated installation, which has to be adapted individually to each case to different airbag shapes and the specific folding sequence thereof. Such complicated folding can only be performed at a limited speed.

U.S. Pat. No. 6,248,052 B1 teaches a method for the folding of an inflatable airbag for motor vehicles which comprises the steps in which an airbag to be folded is fastened with its open end at a carrier. A piston is pushed forward into the airbag through an opening in the carrier and against the closed end of the airbag. The carrier and the piston are introduced into a sleeve, with the airbag being pressed together irregularly.

U.S. application U.S. Pat. No. 6,327,838 B1 teaches a method for folding an airbag for an airbag module involving the straightening out of the airbag, pushing or drawing the airbag into an outer guide device, and lastly pushing the airbag together with the outer device to fold the airbag.

In the present invention, the folding apparatus comprises a plunger mechanism, a folder support apparatus, and a folding tube. The plunger mechanism has a plunger plate, which is attached to an airbag during the folding process. The folder support apparatus has a base reservoir for accommodating the airbag in its folded state. The folding tube has an upper rim defining an opening for receiving an airbag.

The process of folding the airbag consists of the following steps. Attaching a plunger mechanism to an airbag and dropping the airbag into a folding tube. The airbag is compressed into a folder base of the folding tube by forcibly lowering the plunger mechanism down the folding tube, wherein the plunger mechanism remains exterior to the airbag during the folding process. Lastly, the folded airbag is wrapped with a fold retention sheet to prevent it from becoming unfolded.

BRIEF DESCRIPTION OF THE DRAWINGS

The invention is explained in more detail with reference to the figures, in which.

DETAILED DESCRIPTION OF THE INVENTION

Figure 1:
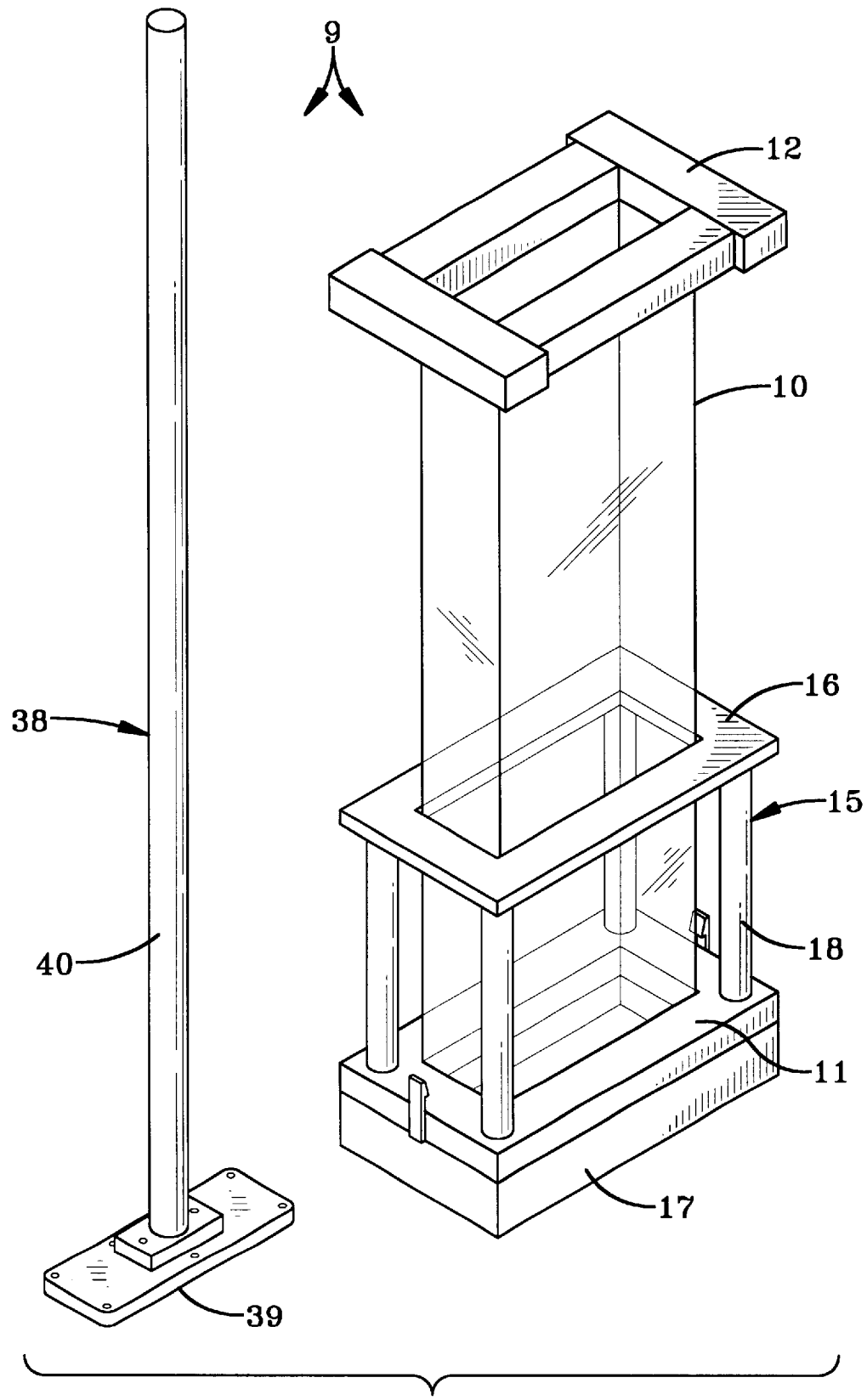
FIG. 1 shows a perspective view of an airbag folding apparatus.

In accordance with the present invention, a folding apparatus 9 is utilized to compress or fold an airbag 41 so that it fits inside an airbag module. FIG. 1 shows a folding apparatus 9 comprising a plunger mechanism 38, a folding tube 10, and a folder support apparatus 17.

The plunger mechanism 38 includes a push tube or rod 40 and plunger plate 39. The plunger mechanism 38 is utilized to compress the airbag 41 inside the folding tube 10. The plunger plate 39 of the plunger mechanism 38 is attached to the airbag 41 during the folding process, which will be subsequently discussed.

The folding tube 10 in FIG. 1 is shown in its bottommost position, with the lower rim 11 of the folding tube 10 flush against the folder base 17 of a folder support apparatus 15. It is not necessary for all four sides of the folding tube 10 to be transparent and as such only the front face can be transparent. The folding tube 10 has an upper rim 12 defining a first opening for receiving an airbag 41 and the plunger mechanism 38.

The folder support apparatus 15 includes a top support member 16 defining a second opening as well as the folder base 17. As can be seen in FIG. 1, the folding tube 10 is rectangularly shaped, however other shapes are suitable for the present invention. The shape of the second opening of the top support member 16 substantially corresponds to the shape of the folding tube 10. Pillars 18 above the folder base 17 support the top support member 16.

The folding tube 10 is movably attached to the folder support apparatus 15 and is capable of manually being moved up or down. It can be appreciated that the folding apparatus 9 can be designed so that the height of the folding tube is adjusted by the aid of a machine.

The lower rim 11 of the folding tube 10 has apertures for receiving pillars 18. The lower rim 11 of the folding tube 10 can slide from a bottommost position where it is adjacent to the folder base 17 to an uppermost position where it is adjacent to the top support member 16. The top support member 16 of the folder base 17 acts as a stop, preventing the complete withdrawal of the folding tube 10. As can be appreciated by one skilled in the art, the lower rim 11 of the folding tube 10 can be eliminated and thus the folding tube 10 would not be movably attached in the folder support apparatus 15 and the folding tube 10 would be removable from the folder support apparatus 15.

Figure 2:
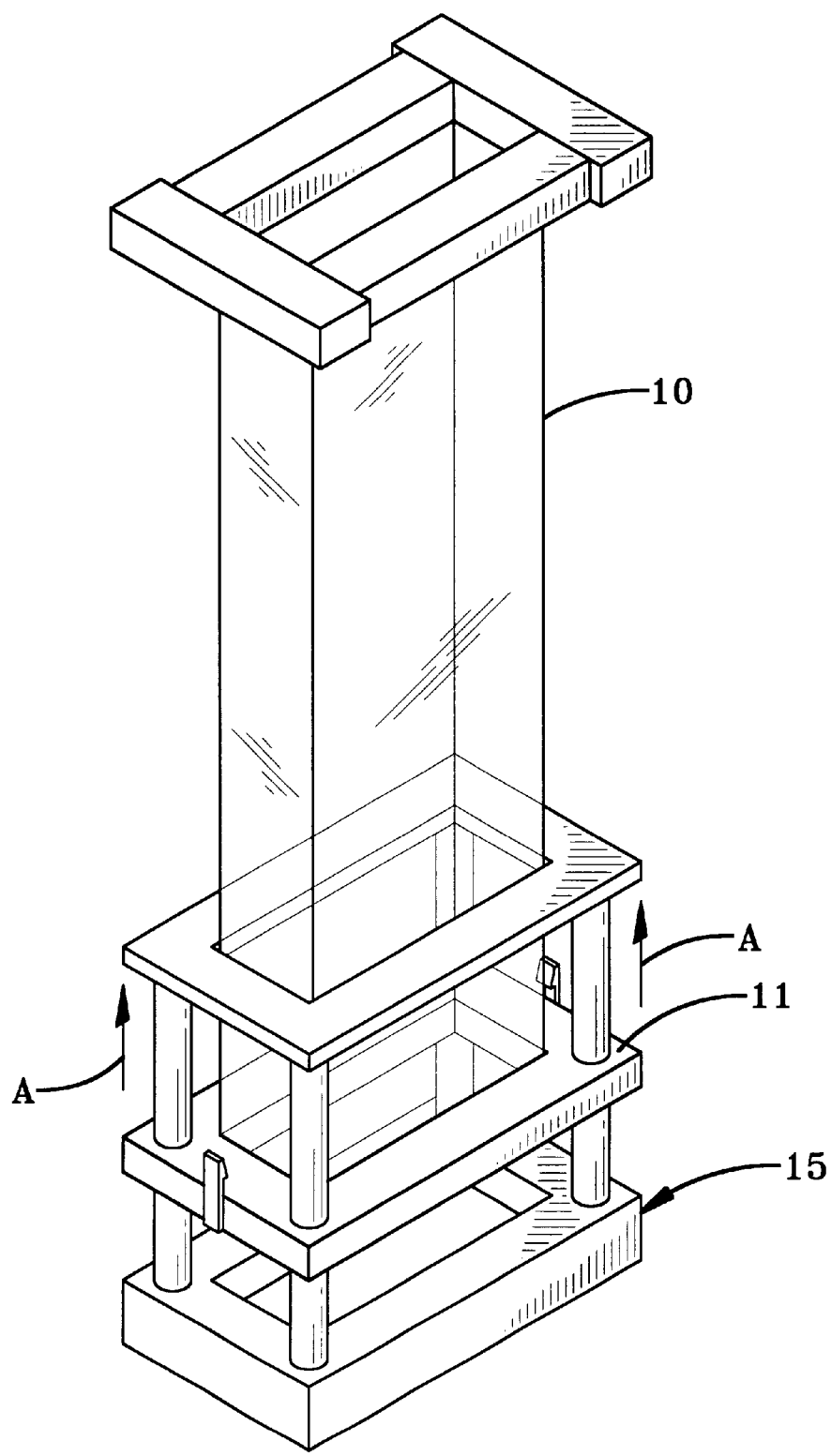
FIG. 2 shows the folding tube being raised in direction A.

In FIG. 2 the folding tube 10 is raised in direction A and is approximately half way between the uppermost position and the bottommost position.

Figure 3:
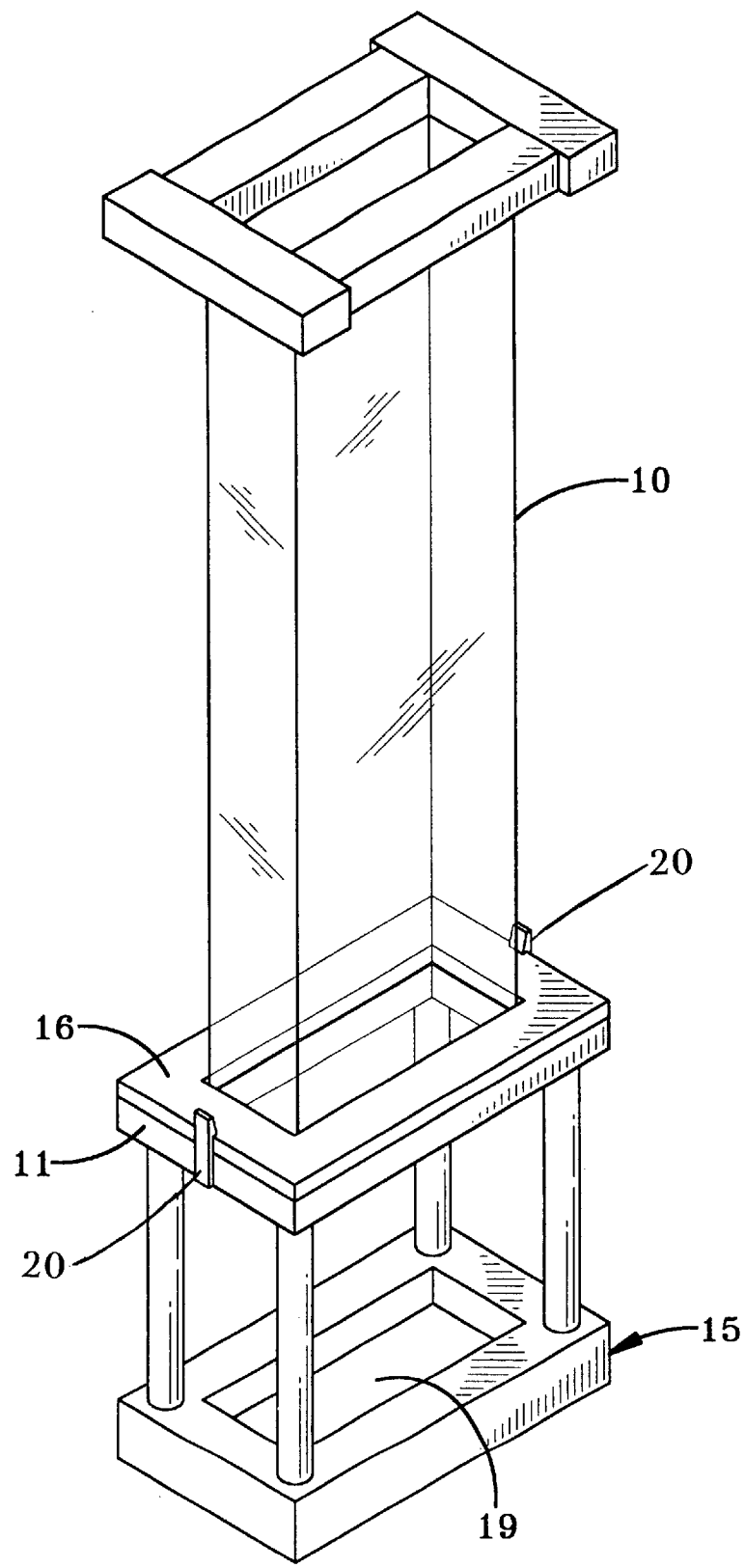
FIG. 3 shows the folding tube in an uppermost position.

In FIG. 3 the folding tube 10 is completely in the uppermost position with the lower rim 11 of the folding tube 10 below and against the underside of the top support member 16 of the folder support apparatus 15. The lower rim 11 is secured in the up position by spring metal clips 20. Clamps or other holding devices can be used to hold the folding tube 10 in its uppermost position.

As can be seen from the first three figures, the folder base 17 includes a base reservoir 19, which is a rectangular shaped notch in the folder base 17. It is appreciated that other shaped notches can be employed for the present invention. As will be discussed later, an airbag 41 is forcibly pushed into the base reservoir 19 and will conform to the shape of the reservoir.

Figure 4:
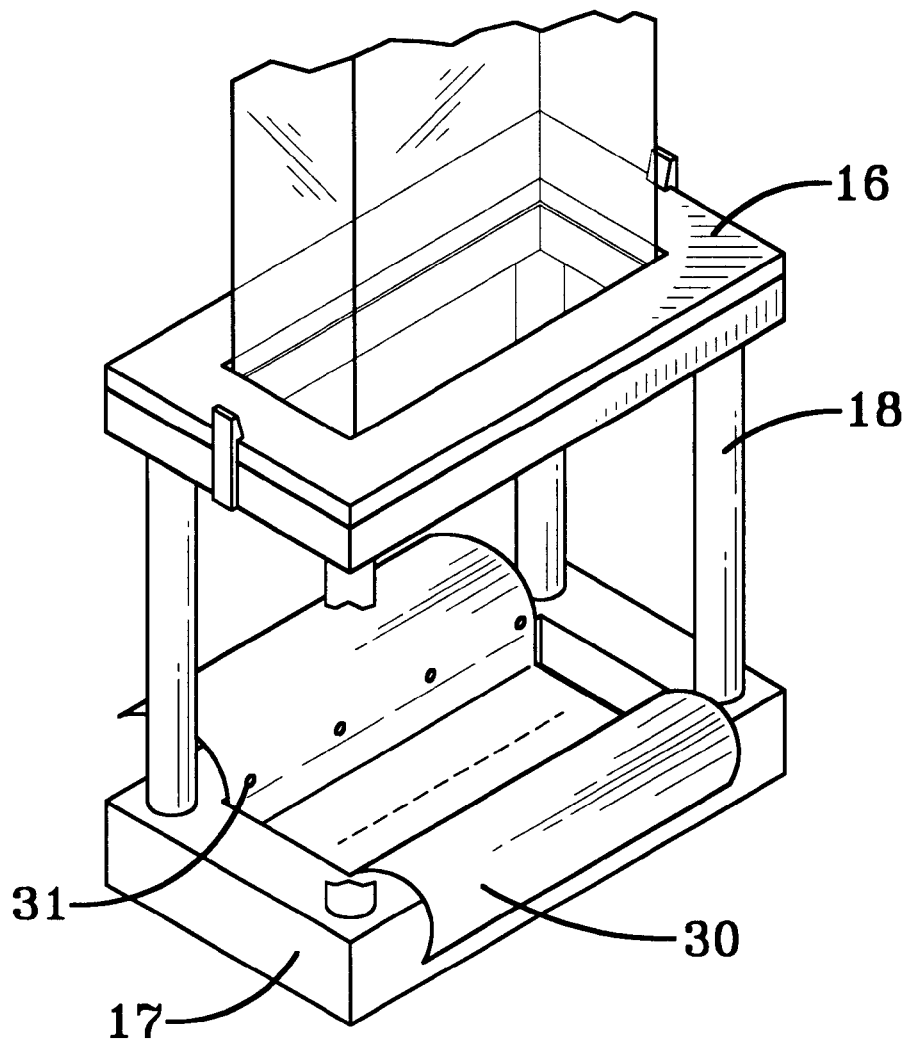
FIG. 4 shows a folder support apparatus with a fold retention sheet.

With reference to FIG. 4, a fold retention sheet 30, which will be used to envelop or cover the folded airbag 41, is placed in the base reservoir 19. This sheet can be made of Tyvek®, paper, thin plastic, airbag material, or any other suitable material. The fold retention sheet 30 is opened as the airbag 41 inflates. The fold retention sheet 30 may be attached to a mounting plate (not shown) by including two sets of holes for receiving studs 36 from the mounting plate. FIG. 4 shows a fold retention sheet with one set of holes 31. The other set of holes is not visible in FIG. 4. The holes are positioned to receive studs 36 from the mounting plate.

Figure 5:
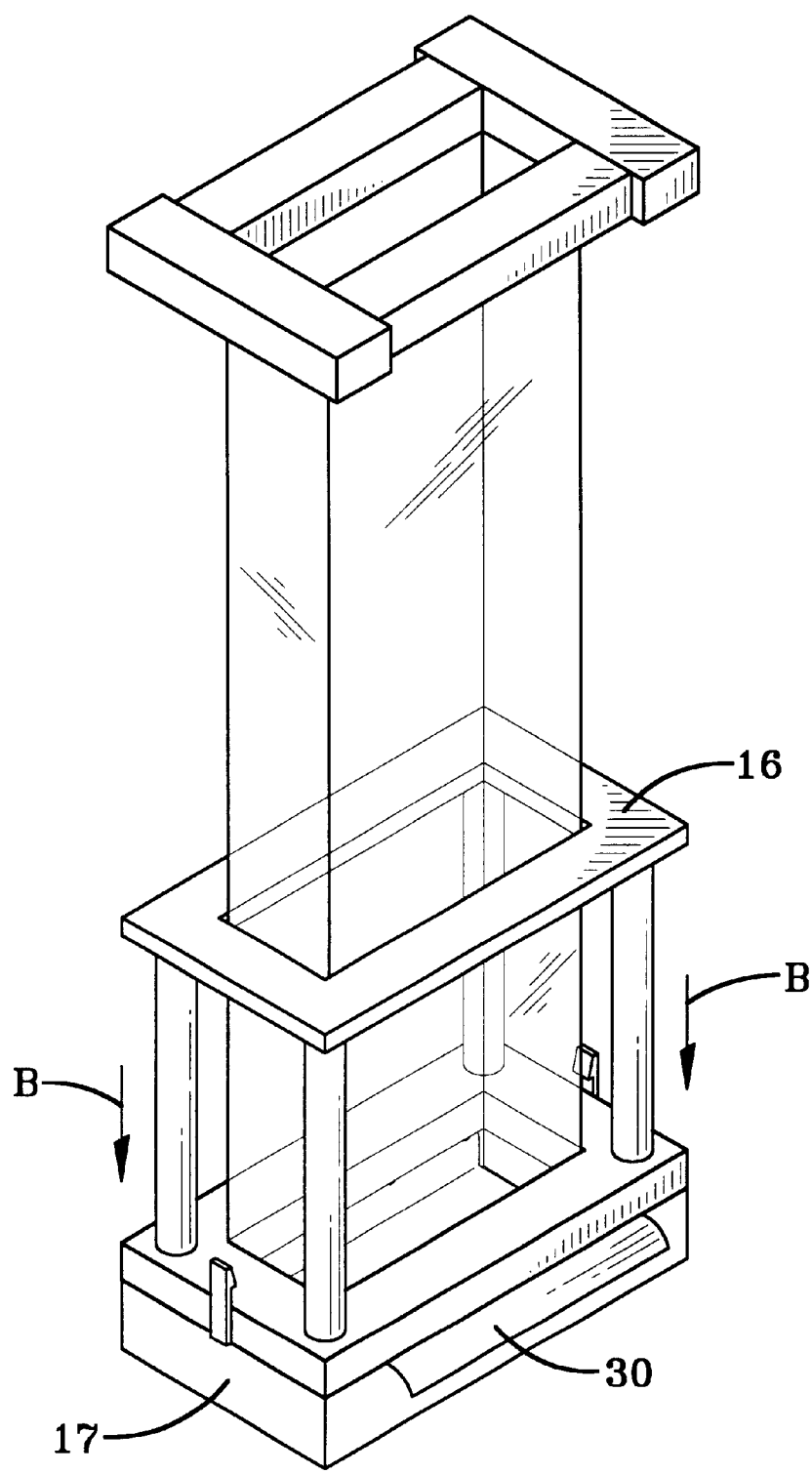
FIG. 5 shows the folder tube being lowered in direction B.

As seen from FIG. 5, the folding tube 10 is slid in direction B back to the bottommost position, trapping the fold retention sheet 30 in place against the folder base 17. A portion of the fold retention sheet 30 can be seen extending from the folder base 17.

Figure 6:
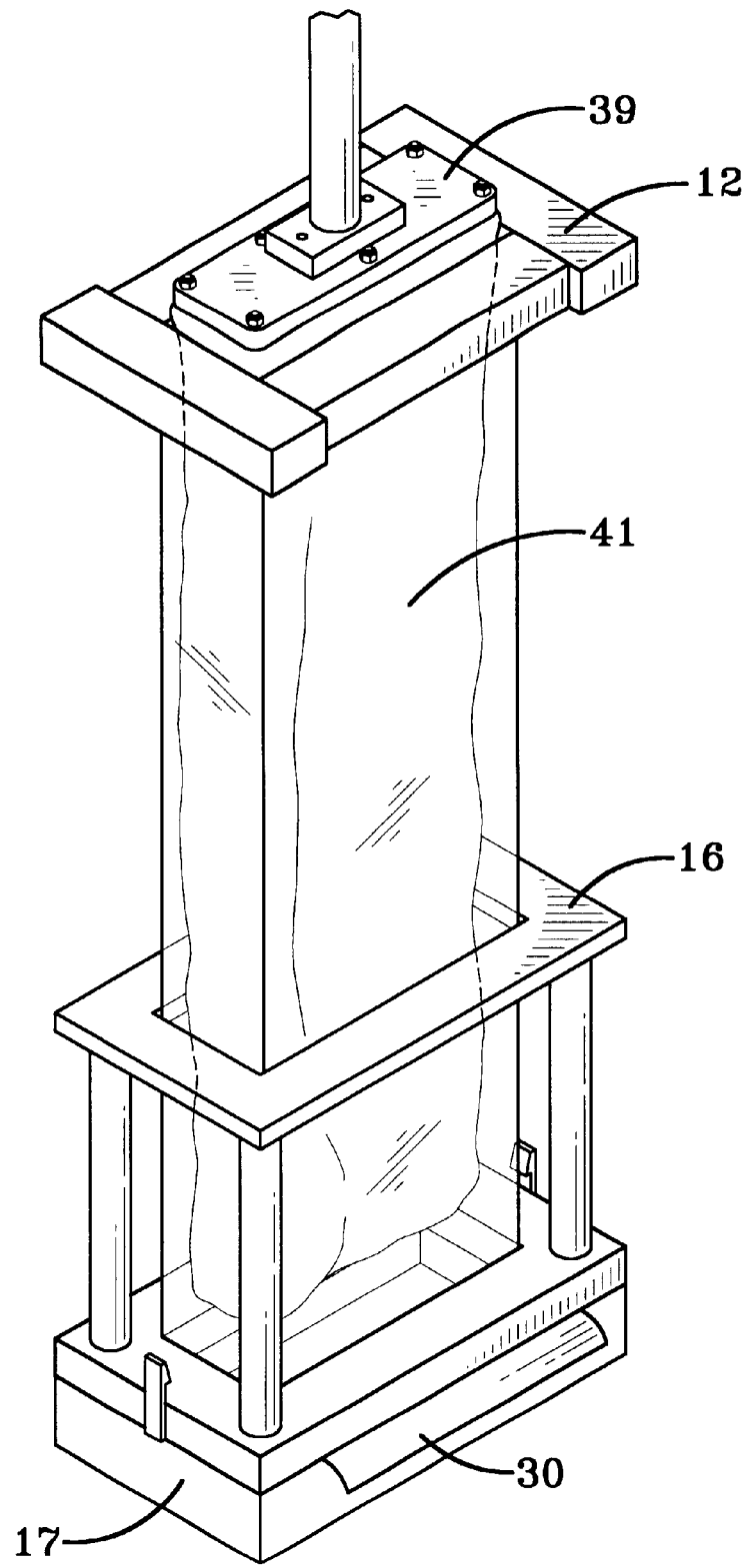
FIG. 6 is a perspective view of the folding apparatus with an airbag.

In FIG. 6, the plunger plate 39 is preferably attached to the mounting plate of the airbag 41; however, the plunger plate 39 may be also directly attached to the airbag 41. The mounting plate has a plurality of studs 36, which correspond to the number of holes in the fold retention sheet. The studs 36 extend away from the airbag cushion. The mounting plate can be oval, round, or any other suitable shape that will be able to slide in the folding tube. It is preferred that the shape of the mounting plate corresponds to the shape of the plunger plate 39. The plunger plate 39 is attached to the mounting plate by twisting a nut 37 or other fastener on each stud. Alternatively, the studs 36 can be tightly received in the plunger plate 39, or can be secured by any other attachment means. The plunger plate 39 is tightly secured to the mounting plate to prevent the airbag 41 and mounting plate from dislodging from the plunger plate 39 during the folding process.

The plunger plate 39 preferably has a cross-sectional surface area that corresponds to the inner cross sectional surface area of the folding tube 10. There is enough space between the plunger plate 39 and the folding tube 10 to allow the plunger plate to move easily in the folding tube along the longitudinal axis thereof. However, the space between the plunger plate and the folding tube is not large to enough for regions of the airbag to pass into this space during the folding process, which could result in the airbag 41 being damaged and the folding apparatus being blocked.

In FIG. 6, the plunger plate 39 is in position proximate the upper rim 12 of the folding tube 10, which is in its bottom-most position with the airbag cushion permitted to fall down therefrom. An end of the airbag 41 opposite to an end attached to the plunger plate 39 is the portion of the airbag that is first lowered into the folding tube 10. The plunger mechanism 38 is introduced into the folding tube 10 after the airbag 41 is completely inside the folding tube 10.

Figure 7:
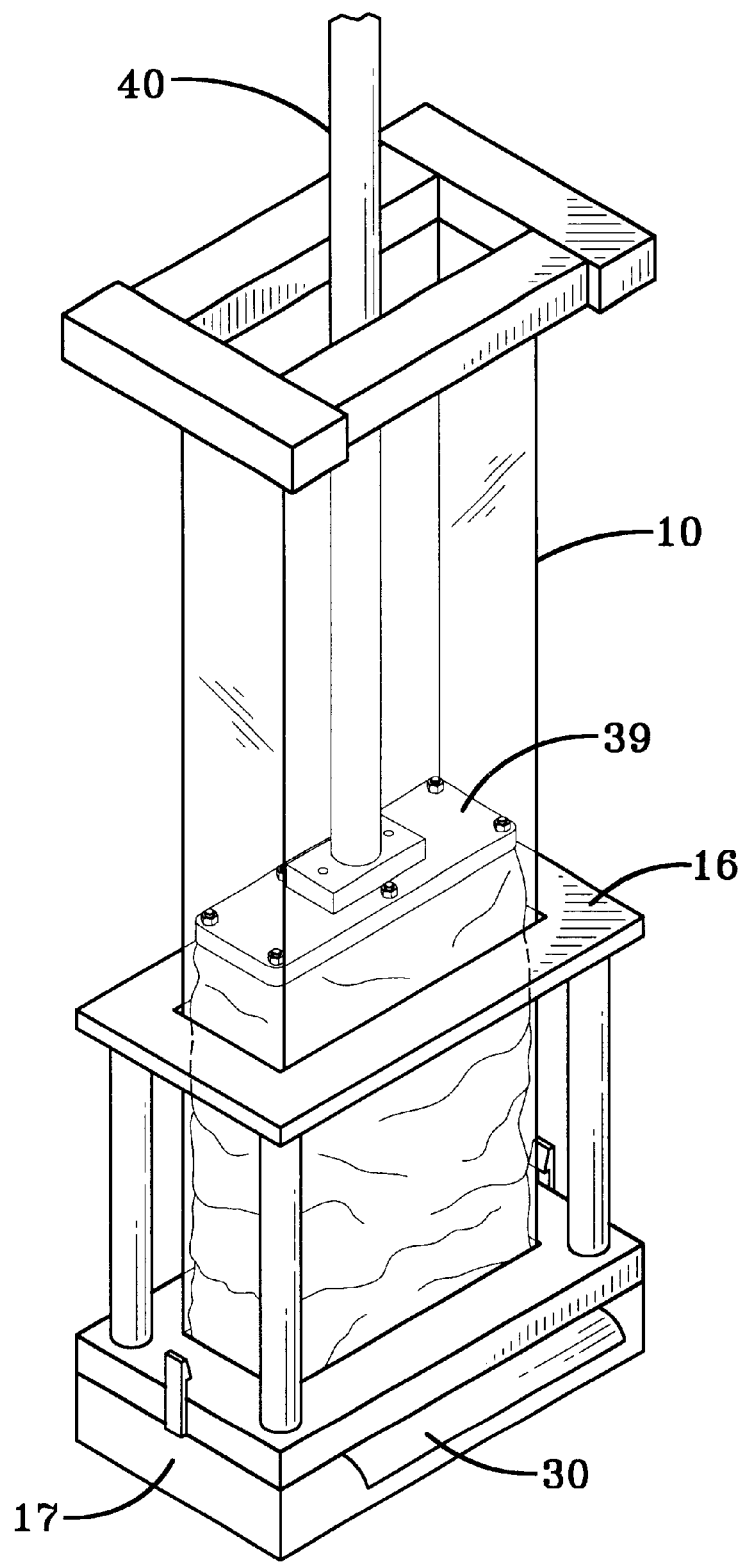
FIG. 7 shows an airbag being compressed by a plunger mechanism.
Figure 8:
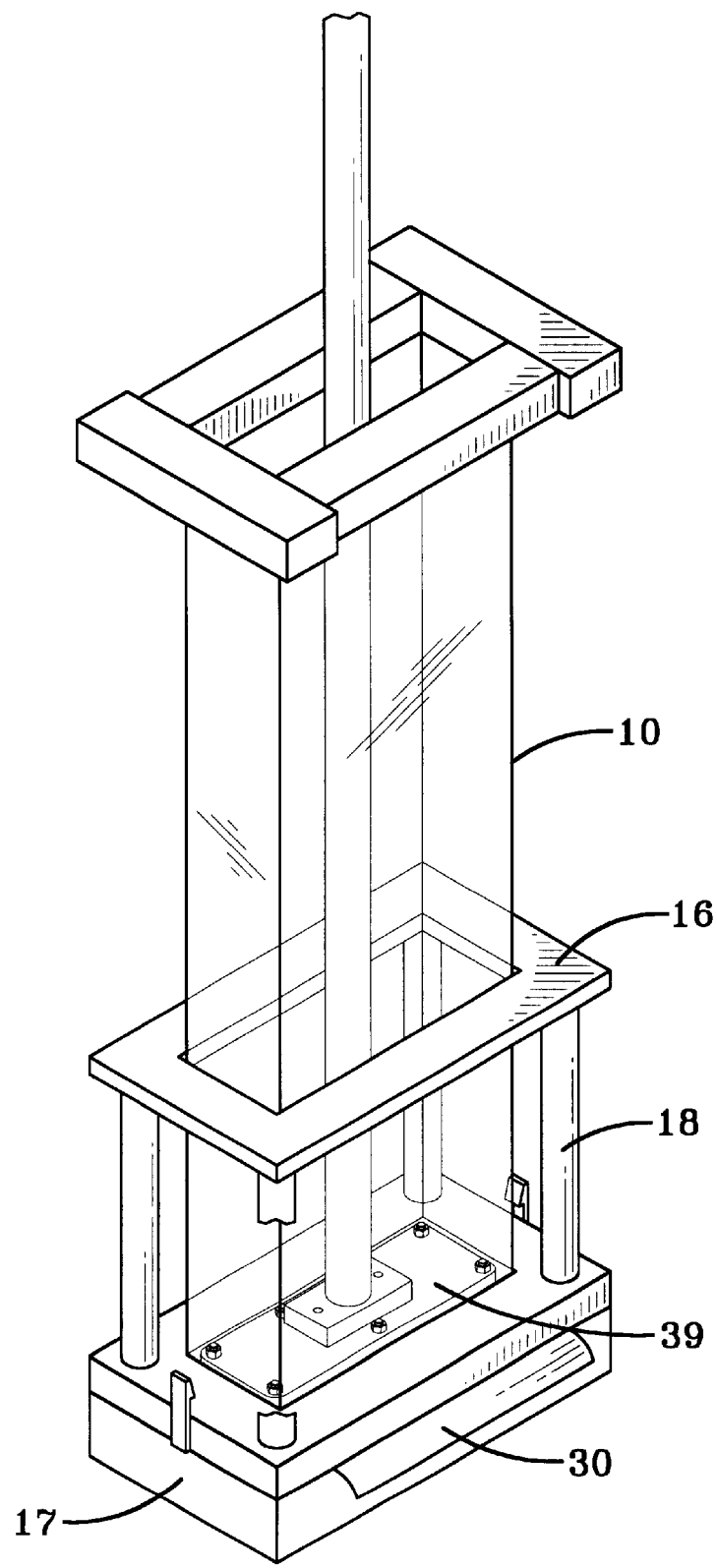
FIG. 8 shows an airbag fully compressed in the folding apparatus.

The plunger plate 39 in FIG. 7 is forcibly lowered partially compressing the airbag 41 down into the base reservoir 19 in a direction that is essentially parallel to the longitudinal axis of the folding tube 10. In FIG. 8, the plunger plate 39 has been completely moved through the folding tube 10 trapping the airbag 41 within the base reservoir 19 of the folder base 17. The plunger plate 39 and the push tube 40 remain exterior to the airbag 41 during the folding process. A portion of the fold retention sheet 30 can be seen extending from the folder base 17.

Figure 9:
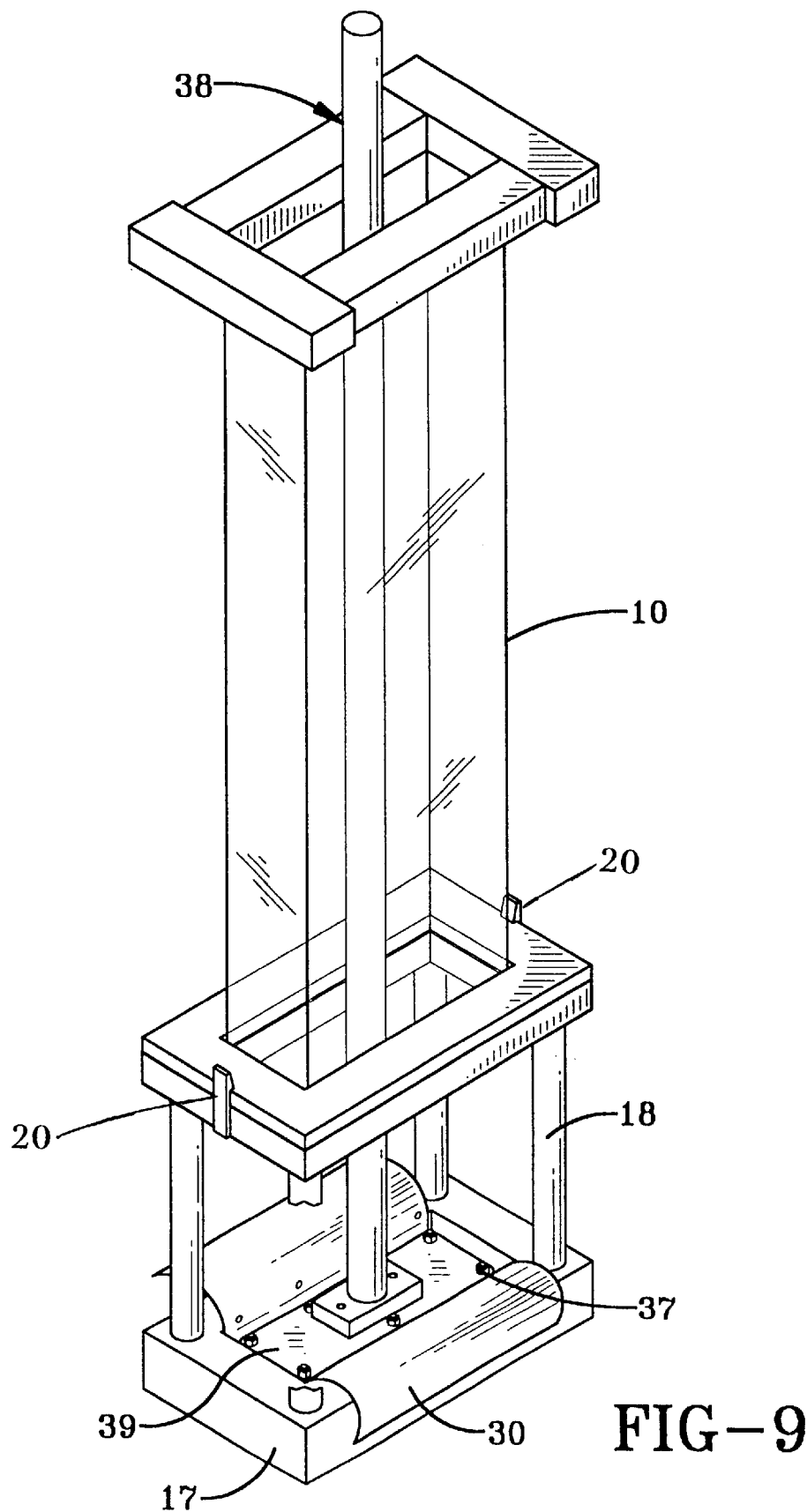
FIG. 9 shows a folding apparatus with the folding tube in the raised position.

Subsequently, the folding tube 10 in FIG. 9 is lifted and secured to the top rim of the folder support apparatus 15 and secured by a fastening device such as a spring metal clips 20 or completely removed so it does not slide back to its bottommost position. As can be seen, the pusher rod and plunger plate are now accessible through the open sides of the folder support apparatus 15.

Subsequently, if used, the nuts 37 or fasteners are removed from the studs 36.

Figure 10:
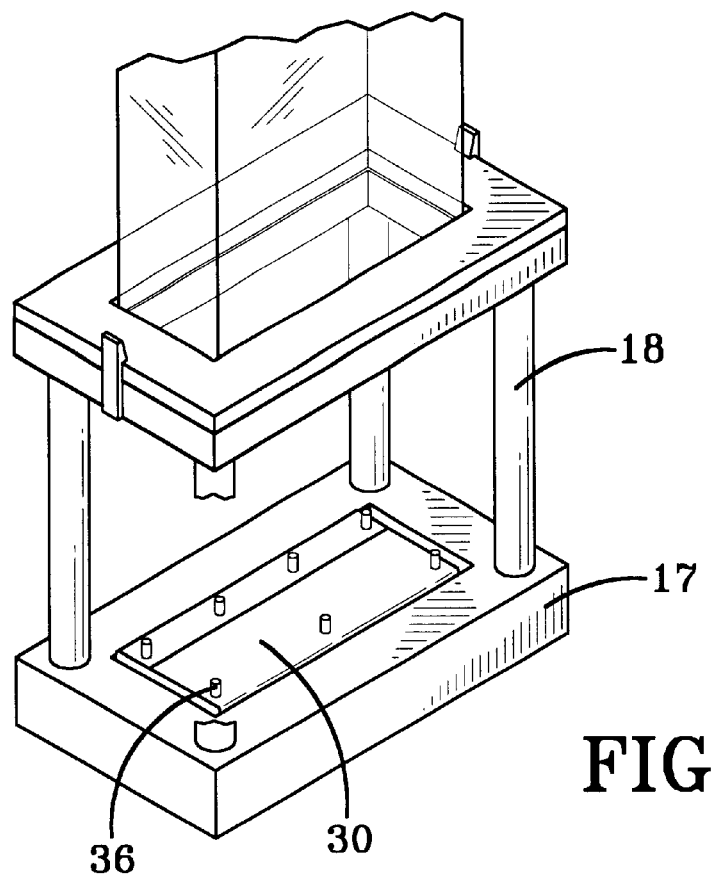
FIG. 10 shows a folded airbag wrapped with a fold retention sheet in the folder base.

The plunger plate 39 is separated from the mounting plate and slid out through the open top of the folding tube 10. The fold retention sheet 30 is again visible. Thereafter as seen in FIG. 10, a first of the sides of the sheet is manipulated and pulled toward the center of the mounting plate so that a first set of studs 36 enters a first set of mounting holes in the sheet. This first side is laid flat on the bottom of the mounting plate. Then the opposite side of the sheet is pulled and also manipulated so that its holes receive the corresponding stud.

Figure 11:
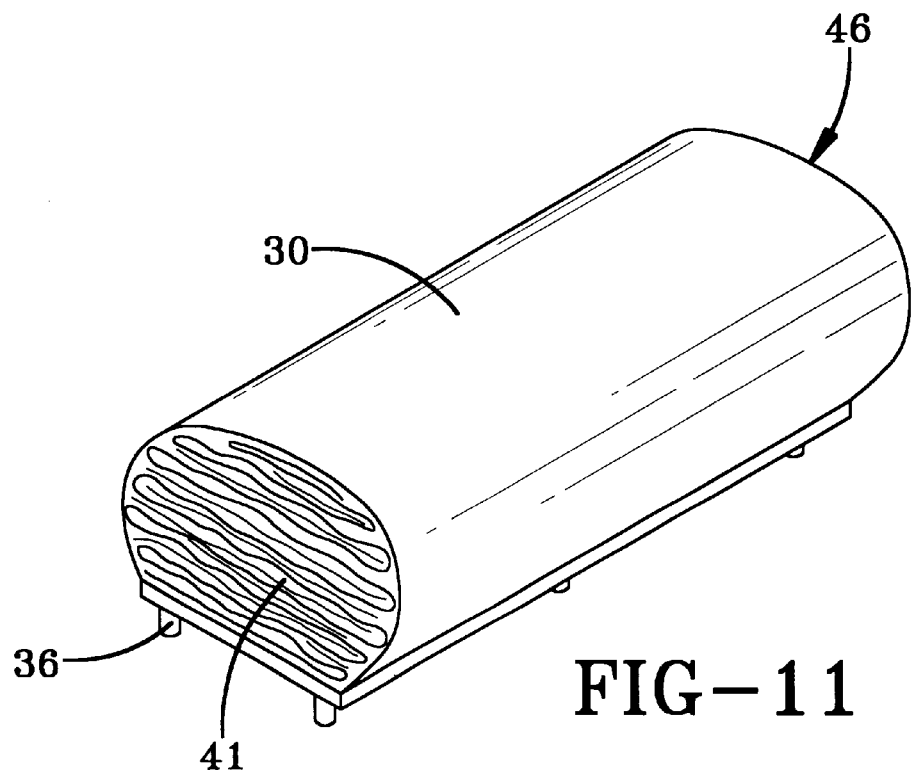
FIG. 11 shows a perspective view of a cushion pack.
Figure 12:
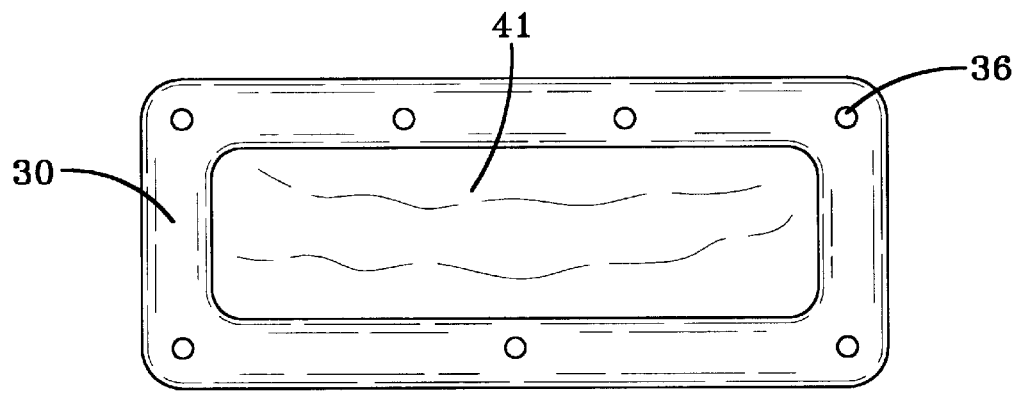
FIG. 12 shows a bottom view of a cushion pack.

Lastly, the cushion pack 46, formed by the folded airbag 41 and the fold retention sheet 30, which envelops the airbag 41, is removed from the base reservoir 19. FIG. 11 shows the cushion pack, which is added to an airbag module (not shown). FIG. 12 shows the underneath portion of the cushion pack. As seen from this drawing, the fold retention sheet does not completely encapsulate the airbag 41 so that inflation gas can enter the airbag in the event of a car collision.

Figure 13:
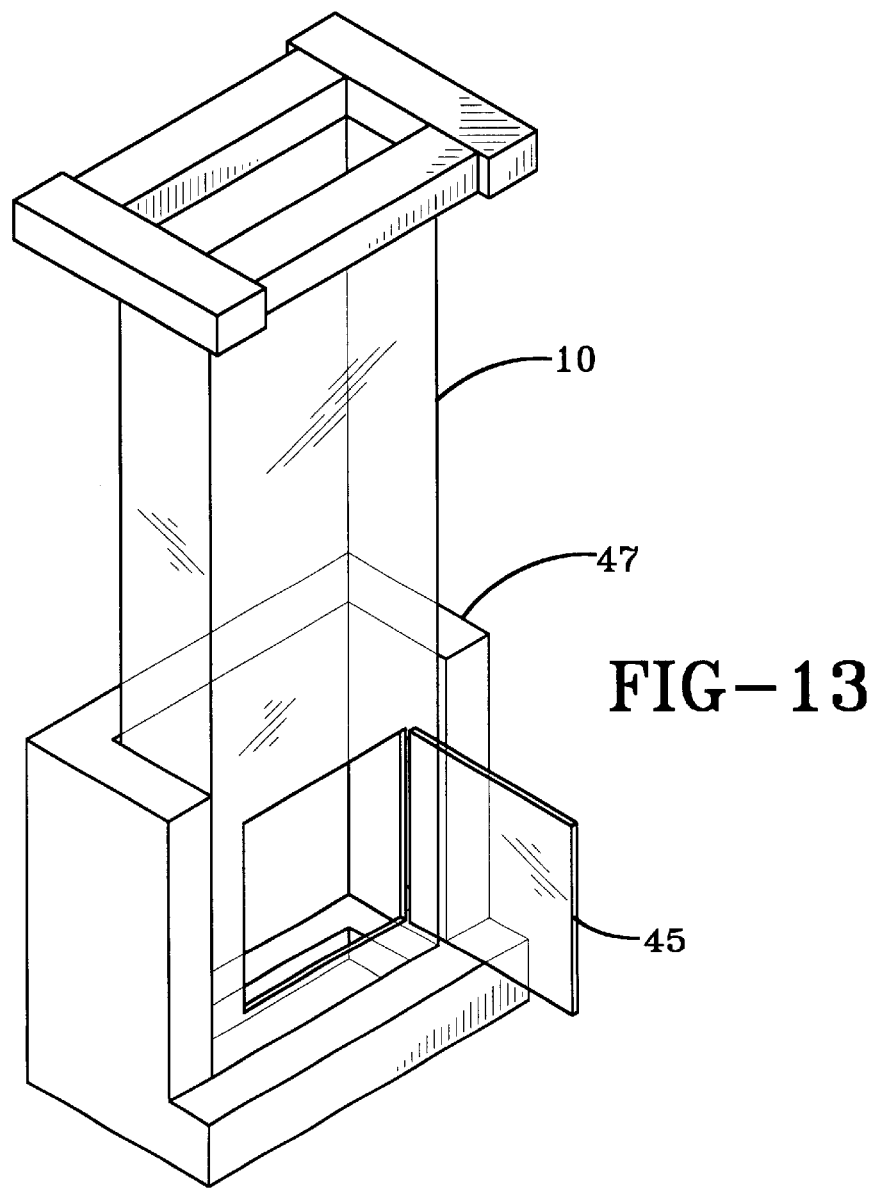
FIG. 13 shows a second embodiment of a folding apparatus with a stationary folding tube.

FIG. 13 shows an alternative embodiment for the present invention. The folding tube 10 in this embodiment is stationary and does not slide up and down the folder support apparatus 47. The folder support apparatus 47 has three walls and the folder tube has an access door 45. The access door is used to place the fold retention sheet 30 inside the folding tube 10 before the folding process commences. During the folding process, the access door is closed to prevent regions of the airbag 41 from escaping the access door. Lastly, the access door is utilized to detach the plunger mechanism 38 from the mounting plate after the airbag 41 is folded and to remove the cushion pack from the base reservoir.

Many changes and modifications in the above-described embodiments of the invention can, of course, be carried out without departing from the scope thereof. Accordingly, that scope is intended to be limited only the scope of the appended claims.

We claim:

1. An airbag folding apparatus comprising:
   a folding tube (10) defining a first opening for receiving an airbag (41);
   a folder support apparatus (15) having a folder base (17) with a second opening for receiving the folding tube (10), the folder base (17) having a base reservoir (19) for accommodating the airbag (41) in a folded state and a plurality of pillars (18) attached on one end to a top support member (16) and on the other end to the folder base (17); and
   a plunger mechanism (38) for pushing the airbag (41) into the base reservoir (19) comprising a push member which remains exterior to the airbag (41) throughout a folding of the airbag (41).

2. An airbag folding apparatus according to claim 1 wherein the folding tube (10) further comprises a lower rim (11) movably attached to the pillars (18), the lower rim (11) has apertures, each aperture receiving a respective one of the pillars (18).

3. An airbag folding apparatus according to claim 2 wherein the folding tube (10) slides from a position adjacent to the folder base (17) to a position adjacent to the top support member (16).

4. An airbag folding apparatus according to claim 2 wherein the lower rim (11) has a fastening means for fastening the lower rim (11) to the top support member (16).

5. An airbag folding apparatus according to claim 1 wherein the plunger mechanism further comprises a plunger plate (39) having a cross-sectional area that substantially corresponds to a cross sectional area of the first opening of the folding tube (10), the plunger plate (39) remains exterior to the airbag (41) during the folding process.

6. An airbag folding apparatus according to claim 5 wherein the plunger plate (39) is attached to the airbag (41).

7. An airbag folding apparatus according to claim 5 wherein the plunger plate (39) is attached to a mounting plate, the plunger plate (39) has a plurality of holes for receiving studs (36) from a mounting plate of the airbag (41) and for securing the airbag (41) to the plunger mechanism.

8. An airbag folding apparatus according to claim 1 wherein the second opening of a top support member (16) has a shape that substantially corresponds to a shape of the folding tube (10).

9. An airbag folding apparatus comprising:
   a folding tube (10) defining a first opening for receiving an airbag (41);
   a folder support apparatus (15) having a folder base (17) with a second opening for receiving the folding tube (10), the folder base (17) having a base reservoir (19) for accommodating the airbag (41) in a folded state, the folder support apparatus (47) having a plurality of walls connecting a top support member (16) to the folder base (17); and
   a plunger mechanism (38) for pushing the airbag (41) into the base reservoir (19) comprising a push member which remains exterior to the airbag (41) throughout a folding of the airbag (41).

10. An airbag folding apparatus according to claim 9 wherein the folding tube (10) has an access door (45) for accessing the folded airbag (41).

11. A process of folding an airbag comprising the steps of:
   (a) attaching a plunger plate (39) of a plunger mechanism (38) to an end of an airbag (41) and thereafter an end of the airbag (41) opposite to the end attached to the plunger plate (39) is lowered first into a folding tube (10) of a folding apparatus (9) and the plunger mechanism (38) is introduced into the folding tube (10) after the airbag (41) is lowered into the folding tube (10), the folding tube being movably attached to a folder base (17) of the folding apparatus, and before lowering the airbag (41) into the folding tube (10), the folding tube is raised to insert a fold retention sheet (30) into a base reservoir (19) and then lowered to secure the fold retention sheet (30) to the folder base (17);
   (b) compressing the airbag (41) into a base reservoir (19) of the folding tube by lowering the plunger mechanism (38) in a direction that is essentially parallel to a longitudinal axis of the folding tube (10) down the folding tube, wherein the plunger mechanism (38) remains exterior to the airbag (41) during the folding process;
   (c) the folding tube (10) is raised from a position adjacent to the folder base (17); and
   (d) wrapping the fold retention sheet (30) around the folded airbag (41).

12. The process according to claim 11, wherein the fold retention sheet (30) is placed on the base reservoir (19) of the folder base (17) before the airbag (41) is dropped into the folding tube (10).

13. The process according to claim 12, wherein in step (a) a plurality of studs from a mounting plate of an airbag (41) pass through corresponding holes in the plunger plate (39).

14. The process according to claim 13, wherein a plunger plate (39) of the plunger mechanism (38) has a cross sectional surface area that substantially corresponds to a cross sectional area of a first opening of the folding tube (10), the plunger mechanism (38) remains attached to the airbag (41) during the folding process.

15. The process according to claim 13 wherein after step (b) the plunger mechanism (38) is detached from the mounting plate of the airbag (41).

16. The process according to claim 13 wherein the folding tube (10) has an access door (45), wherein the fold retention sheet (30) is placed into the base reservoir (19) via the access door before the airbag (41) is dropped into the folding tube (10).

17. The process according to claim 16, wherein the door is in its closed position during the compressing of the airbag (41), the door is opened after step (b) and the plunger mechanism (38) is detached from the mounting plate of the airbag (41).

* * * * *